United States Patent Office 2,763,690
Patented Sept. 18, 1956

2,763,690

PROCESS FOR THE MANUFACTURE OF SOLUTIONS OF 2-AMINONAPHTHALENE IN ORGANIC SOLVENTS

Alfred Hagenboecker, Basel, Switzerland, assignor to Ciba Limited, Basel, Switzerland, a Swiss firm No Drawing. Application December 6, 1951, Serial No. 260,345

Claims priority, application Switzerland December 15, 1950

6 Claims. (Cl. 260—578)

It is known that the handling of 2-aminonaphthalene can lead to serious injury to health and it is therefore desirable in chemical operations to avoid as far as possible reactions which necessitate the handling of 2-aminonaphthalene. On the other hand, there are some cases in which it is necessary to use for reactions solutions of 2-aminonaphthalene in organic solvents, for example, in the production of ortho-oxyaryl carboxylic acid-β-naphthylamides, especially the β-naphthylamide of 2:3-oxynaphthoic acid.

The present invention is based on the observation that solutions of 2-aminonaphthalene in organic solvents can be made by heating 2-aminonaphthalene-1-sulphonic acid in the presence of an organic solvent with less than 1 molecular proportion of aqueous sulfuric acid at a temperature above 110° C., the organic solvent and the concentration of the sulfuric acid being advantageously so chosen that the boiling point of the mixture is above 110° C., and, after the hydrolysis, liberating from its sulphate the 2-aminonaphthalene in the reaction mixture.

As the organic solvent for the present process there is advantageously chosen one which under the conditions used is stable towards the sulfuric acid present and the sulfuric acid formed during the reaction, and which is inert towards 2-aminonaphthalene.

There are a great deal of organic solvents which fulfill these requirements and therefore it is possible to choose the solvent according to the purpose for which the final solution of 2-aminonaphthalene is intended. If desired, mixtures of two or more solvents may be used. In view of the conditions of reaction more fully set out below, most benzene hydrocarbons and halogenated benzenes are well suited for the present invention since they are substantially immiscible with water and are substantially not sulfonated under the present conditions.

It is also of advantage to choose a solvent having a boiling point distinctly higher than 110° C., for example, chlorobenzene or ortho-dichlorobenzene, as then the reaction can be carried out under atmospheric pressure.

The reaction may also be carried out in the presence of a solvent which boils in the vicinity of 110° C. such, for example, as toluene (boiling at 110.8° C.) or boils at a temperature below 110° C., but it is then necessary to work in a pressure vessel in order to attain the temperature at which the hydrolysis proceeds at a commercially useful speed.

If it is desired to work under atmospheric pressure in a solvent boiling above 110° C., the concentration of the sulfuric acid used must be such that the boiling point of the latter itself and also the boiling point of the resulting mixture with the organic solvent are higher than 110° C.

Since a mixture of ½ gram-mol of sulfuric acid of 50 per cent. strength (98 grams) with 1000 cc. of chlorobenzene gives a boiling point depression to about 114° C., sulfuric acid of 70 per cent. strength (70 grams) to about 126° C. and sulfuric acid of 80 per cent. strength (61 grams) to about 129° C., and as it has been found that in order to avoid unnecessarily prolonging the period of reaction it is of advantage to use a temperature above 115° C., especially above 120° C., the concentration of the sulfuric acid must be above 50 per cent. and advantageously ranges from 60–80 per cent.

The use of sulfuric acid of higher concentration than 80 per cent. is not indicated, because the sulfuric acid introduced would become so highly concentrated by the consumption of one molecular proportion of water necessary for the reaction, on the one hand, and by the additional sulfuric acid formed in the hydrolysis, on the other hand, that only partial hydrolysis would occur. There would also be the risk of undesired side reactions, for example, re-sulphonation.

In order to attain the temperature above 110° C. favourable for the hydrolysis when working in a pressure vessel, it is not necessary to use a minimum concentration of sulfuric acid. It is convenient also in this case to choose so high a concentration of sulfuric acid that at the end of the reaction the sulfuric acid is of a concentration ranging from 70 to 80%, because with low concentrations considerable losses in yield occur due to aminolysis.

In starting and carrying on the hydrolysis with small quantities of sulfuric acid, for example, a ½ molecular proportion of sulfuric acid of 60 per cent. strength per molecular proportion of 2-aminonaphthalene-1-sulphonic acid, the sulfuric acid becomes concentrated to such an extent that the concentration exceeds the advantageous limit of 80 per cent., as will be seen from the following equation:

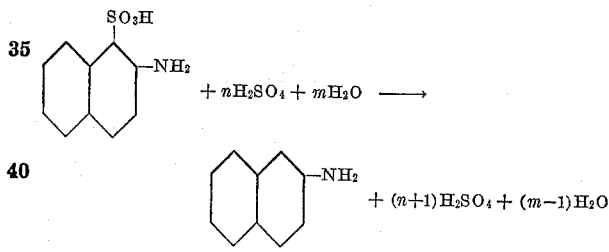

223 parts of 2-aminonaphthalene-1-sulphonic acid+49 parts of H$_2$SO$_4$+32.7 parts of water=143 parts of 2-aminonaphthalene+147 parts of H$_2$SO$_4$+14.7 parts of water. By calculation 161.7 parts of H$_2$SO$_4$ having a concentration of approximately 91 per cent. would result. Thus, in order to attain the desired final concentration of 80 per cent. H$_2$SO$_4$ or lower it is necessary to add at least a further 22 parts of water.

This is advantageously achieved by a controlled addition of water during the reaction such that the sulfuric acid concentration is maintained below 80 per cent, and preferably at values ranging from about 65–75 per cent.

The reaction may be carried out in an apparatus fitted with a reflux condenser.

Especially suitable is a circulation apparatus in which it is possible by means of a suitable cock either to remove water from the reaction mixture (take it out of circulation) or introduce water into the system as required.

This apparatus, as compared with that first described, has the following advantage:

If the addition of relatively dilute sulfuric acid is too rapid, especially when the additional water is added very rapidly, it can happen in the case of the refluxing apparatus that so low a boiling temperature is established that the hydrolysis does not proceed or proceeds at a rate which is not commercially useful.

However, if this occurs in the circulation apparatus the optimum boiling temperature can easily be reestablished by removing small amounts of water from the system.

In the circulation apparatus the total quantity of sulfuric acid may be present from the outset and a relatively dilute sulfuric acid, for example, of 50 per cent. strength, can be used, and the reaction can be initiated by withdrawing water from the system until a boiling temperature of 120° C. is attained. Without withdrawing further water the temperature will then rise to 129° C. and above. However, it is of advantage to maintain the temperature between 126 and 128° C. by the addition of small quantities of water until the boiling point ceases to increase when the mixture is further boiled. This is a clear indication that the concentration of the sulfuric acid is no longer being increased by the consumption of water and the formation of sulfuric acid and that the reaction has terminated.

Apart from the fact that errors in operation can be easily corrected in the circulation apparatus, this apparatus is also of advantage because the danger point of excessively strong boiling, which occurs when sulfuric acid, for example, of 60 per cent. strength, is introduced into boiling chlorobenzene, does not exist. The necessary caution is required only in introducing the water.

By the use of these and similar measures it is possible in accordance with the present invention to carry out the hydrolysis of 2-aminonaphthalene-1-sulphonic acid with considerably less than 1 molecular proportion of aqueous sulfuric acid, for example, with ¼ to ½ of a molecular proportion, or even less.

After the hydrolysis, the 2-aminonaphthalenesulphate can be converted into the free base in known manner by the addition of a solution or suspension of an alkali or alkaline earth metal hydroxide or carbonate. The aqueous layer which separates can be drawn off, and the remainder of the moisture eliminated by azeotropic distillation. If, however, the presence of alkali sulphates is not undesirable in the further treatment, the separation of the aqueous layer may be dispensed with and the mixture, after neutralisation advantageously with a strong solution of alkali, may be azeotropically dried, whereby the danger to hygiene connected with the separation of the aqueous layer is avoided.

The process of the invention has the advantage that it can be carried out in apparatus under atmospheric pressure, or by choosing a suitable solvent such as toluene, under slightly superatmospheric pressure, to yield a solution of naphthylamine in an organic solvent without the need of handling solid naphthylamine.

As the dissolved naphthylamine is further treated without being isolated the danger to hygiene, which is connected with the production of isolated naphthylamine, on the one hand, and with the handling of the naphthylamine during further working up, or the other, is reduced to a minimum.

As compared with known proposals to use highly concentrated acid for the hydrolysis, the present process has the advantage that only a very small quantity of acid and correspondingly a substantially smaller amount of alkali for the production of the free base, are required.

It was found that the hydrolysis should not be carried out with aqueous sulfuric acids of substantially less than 30 per cent. strength because under these conditions substantial losses in yield occur due to aminolysis.

The following examples illustrate the invention, the parts and percentages being by weight unless otherwise stated, and the relationship of parts by weight to parts by volume being the same as that of the kilogram to the liter:

*Example 1*

68.5 parts of sulfuric acid of 70 per cent. strength are slowly introduced dropwise into a boiling suspension of 223 parts of 2-aminonaphthalene-1-sulphonic acid in 1200 parts by volume of chlorobenzene. The hydrolysis sets in immediately. The initially well suspended 2-aminonaphthalene-1-sulphonic acid agglomerates to a viscous mass, consisting of the sulphate of 2-aminonapthalene and sulfuric acid and some still non-hydrolyzed starting material. Notwithstanding this the hydrolysis proceeds, which is evident from the fact that the boiling temperature drops only transiently to about 125° C. and very soon rises again.

When the boiling temperature has again reached 128° C., there is slowly added a quantity of water such that the temperature does not fall below 120° C., and boiling is continued until the temperature has risen a few degrees.

The addition of water is repeated in the same manner a few times more until finally the temperature remains constant at 122° C. even after prolonged boiling. This is an indication that the reaction has terminated, since after the complete splitting of the sulphonic acid group an increase in the concentration of the sulfuric acid and consequently an increase in the boiling temperature are no longer possible.

A test portion of the filtrate rendered alkaline, when acidified with mineral acid, then yields no precipitate of the very sparingly soluble 2-aminonaphthalene-1-sulphonic acid and in the acid state takes up only very little sodium nitrite. This end point is generally reached after a reaction period of 6–7 hours.

The reaction mixture is then rendered alkaline to phenolphthalein paper by the addition of caustic soda solution of 50 per cent. strength. If the reaction has been properly carried out almost 3 molecular proportions of caustic soda are required for this purpose. If an alkaline reaction persists with small quantities of alkali, the reaction has not been properly terminated.

When it is necessary for the further working up of the naphthylamine solution in chlorobenzene to be carried out in an anhydrous medium, the water which has been introduced and the water produced in the reaction are eliminated by azeotropic distillation. Furthermore if a naphthylamine solution free from sodium sulphate is desired, the mixture may be diluted with water and the salt solution separated, and the residue further washed with water and freed from moisture by azeotropic boiling.

By removing the chlorobenzene by steam distillation from a test portion rendered alkaline, and filtering the cooled contents of the distillation vessel, naphthylamine can be isolated which has a clear appearance and good melting point.

The alkaline filtrate, when rendered acid with mineral acid, yields no precipitate of 2-naphthylamine sulphonic acid and contains at most 3–4 per cent. of the initial quantity of amine as measured by the consumption of nitrite. Naphthol sulphonic acid or naphthol is not detectable or detectable at most in traces.

*Example 2*

49 parts of sulfuric acid (¼ mol) of 50 per cent. strength are added to a suspension of 223 parts of 2-aminonaphthalene-1-sulphonic acid (1 mol) in 1000 parts by volume of chlorobenzene, and the resulting suspension boiling at about 112° C. is subjected to circulatory distillation accompanied by the removal of water until a boiling temperature of 120° C. is attained.

The mixture is then subjected to total reflux. The boiling temperature rises in ½ to 1 hour to 126–128° C. There is then slowly introduced a quantity of water such that the boiling temperature falls to 120–122° C. After a short time the temperature again rises a few degrees. The addition of water is then repeated a few times until finally, after prolonged boiling, the temperature no longer rises.

A test portion treated as described in Example 1 indicates when the reaction has terminated.

The complete reaction generally lasts 6–7 hours. The product is neutralised with about 2½ molecular proportions of alkali and further worked up as described in Example 1.

*Example 3*

81.7 parts of sulfuric acid (½ mol) of 60 per cent. strength are added very slowly to a suspension boiling at about 179° C. of 223 parts of 2-aminonaphthalene-1-sulphonic acid (1 mol) in 1000 parts by volume of orthodichlorobenzene. Owing to the very considerable depression of the boiling point caused by the addition intense boiling sets in.

The addition is interrupted after, for example, about ⅓ of the sulfuric acid has been introduced, and then the boiling temperature rises after a few minutes by about 10–15° C. Owing to the relatively high temperatures which can easily be attained in this manner the hydrolysis proceeds especially rapidly.

When, after the addition of the whole of the sulfuric acid, the temperature begins to rise again, such a quantity of water is cautiously added as to bring the boiling point of the mixture to 126–128° C.

When the boiling temperature no longer shows any tendency to rise the mixture is worked up as described in the preceding examples. The quality and yield of the naphthylamine correspond to those of the product obtained in the preceding examples.

*Example 4*

223 parts of 2-aminonaphthalene-1-sulphonic acid (1 mol) are heated in 800 parts by volume of toluene in an autoclave with the addition of 24.5 parts of monohydrate and 49 parts of water for 8 hours at 132–135° C. As the hydrolysis proceeds and the concentration of the sulfuric acid increases the pressure drops several tenths of an atmosphere in the first hour.

The method of working up and the yield are similar to those described in the preceding examples. Including the sulfuric acid bound to the naphthylamine the final concentration of the sulfuric acid is about 80 per cent.

*Example 5*

223 parts of 2-naphthylamine-1-sulphonic acid (1 mol) are heated in 1000 parts by volume of chlorobenzene in an autoclave with 117.6 parts of sulfuric acid (0.4 mol) of 33.3 per cent. strength for 10 hours at 126–128° C. The pressure falls from about 2.2 to 1.8 atmospheres gauge pressure in the first hour and then remains constant.

After cooling the autoclave the product is worked up in the manner described in the preceding examples.

The yield of 2-naphthylamine is in this example also above 95 per cent., and the content of 2-naphthol-1-sulphonic acid is below 1 per cent.

What I claim is:

1. A process for preparing solutions of 2-aminonaphthalene in an organic solvent, which comprises heating one molecular proportion of 2-aminonaphthalene-1-sulfonic acid with less than one molecular proportion of aqueous sulfuric acid having a concentration between about 30% and 80% in an organic solvent stable towards sulfuric acid, inert towards 2-amino-naphthalene and not miscible with water, at a temperature above 110° C., and converting the sulfate of 2-aminonaphthalene formed by hydrolysis of the said 2-aminonaphthalene-1-sulfonic acid into the free base.

2. A process for preparing solutions of 2-aminonaphthalene in an organic solvent, which comprises heating one molecular proportion of 2-aminonaphthalene-1-sulfonic acid with less than one molecular proportion of aqueous sulfuric acid having a concentration between about 30% and 80% in an organic solvent stable towards sulfuric acid, inert towards 2-amino-naphthalene and not miscible with water, the boiling point of the mixture being above 110° C. under atmospheric pressure, at a temperature above 110° C., and converting the sulfate of 2-aminonaphthalene formed by hydrolysis of the said 2-aminonaphthalene-1-sulfonic acid into the free base.

3. A process for preparing solutions of 2-aminonaphthalene in an organic solvent, which comprises heating a mixture of one molecular proportion of 2-aminonaphthalene-1-sulfonic acid, less than one molecular proportion of aqueous sulfuric acid, and an organic solvent stable towards sulfuric acid, inert towards 2-aminonaphthalene and not miscible with water, the boiling point of the said mixture being above 115° C. under atmospheric pressure, at a temperature above 115° C., while controlling the water content of the mixture in order to keep the concentration of the aqueous sulfuric acid above about 30 per cent. and below about 80 per cent., and converting the sulfate of 2-aminonaphthalene formed by hydrolysis into the free base.

4. A process for preparing solutions of 2-aminonaphthalene in an organic solvent, which comprises heating to the boil a mixture of one molecular proportion of 2-aminonaphthalene-1-sulfonic acid, less than one molecular proportion of aqueous sulfuric acid, and an organic solvent stable towards sulfuric acid, inert towards 2-amino-naphthalene and not miscible with water, the boiling point of the said mixture being between about 115° C. and 135° C., under atmospheric pressure, at a temperature above 115° C., while controlling the water content of the mixture in order to keep the concentration of the aqueous sulfuric acid above about 30 per cent. and below about 80 per cent., and converting the sulfate of 2-aminonaphthalene formed by hydrolysis into the free base.

5. A process for preparing solutions of 2-aminonaphthalene in an organic solvent, which comprises heating a mixture of one molecular proportion of 2-aminonaphthalene-1-sulfonic acid, less than one molecular proportion of aqueous sulfuric acid, and an organic solvent stable towards sulfuric acid, inert towards 2-amino-naphthalene and not miscible with water, the boiling point of the said mixture being above 115° C. under atmospheric pressure, at a temperature above 115° C., while controlling the water content of the mixture in order to keep the concentration of the aqueous sulfuric acid between about 50 per cent. and about 80 per cent., and converting the sulfate of 2-aminonaphthalene formed by hydrolysis into the free base.

6. In a process for preparing solutions of 2-aminonaphthalene in an organic solvent by heating a mixture of 2-aminonaphthalene-1-sulfonic acid, aqueous sulfuric acid and an organic solvent while controlling the water content of the mixture in order to keep the concentration of the aqueous sulfuric acid above about 30 per cent and below about 80 per cent, and converting the sulfate of 2-aminonaphthalene formed by hydrolysis into the free base, the steps which comprise heating to the boil with reflux cooling a mixture of one molecular proportion of 2-aminonaphthalene-1-sulfonic acid, about ¼ to ½ molecular proportion of aqueous sulfuric acid and chlorobenzene and controlling the water content of the mixture to maintain a boiling point between about 120° and 130° C.

References Cited in the file of this patent

Green et al.: J. Chem. Soc., vol. 113 (1918), pp. 35–44.
Thorpe: "Dict. of Applied Chem.," vol. 4 (1928), p. 439, pub. by Longmans, Green and Co.